(12) United States Patent
Embach et al.

(10) Patent No.: US 7,427,109 B2
(45) Date of Patent: Sep. 23, 2008

(54) PNEUMATIC FOAM CUSHION

(75) Inventors: James T. Embach, Rochester Hills, MI (US); Jason G. Tilk, Cleveland Hts, OH (US); Chet R Wisniewski, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 487 days.

(21) Appl. No.: 10/984,672

(22) Filed: Nov. 9, 2004

(65) Prior Publication Data

US 2006/0108853 A1    May 25, 2006

(51) Int. Cl.
*A47C 7/02* (2006.01)
(52) U.S. Cl. .............................. 297/452.41; 297/452.61
(58) Field of Classification Search ............ 297/452.41, 297/452.58, 452.61, DIG. 3, DIG. 1, DIG. 2; 5/655.3
See application file for complete search history.

(56) References Cited

U.S. PATENT DOCUMENTS

| | | | | |
|---|---|---|---|---|
| 2,826,244 A * | 3/1958 | Hurley | ......................... | 267/145 |
| 2,997,100 A | 8/1961 | Morris | ........................... | 5/348 |
| 3,187,069 A * | 6/1965 | Pincus et al. | ............... | 264/46.8 |
| 3,792,501 A * | 2/1974 | Kery | ............................. | 5/12.1 |
| 4,213,213 A | 7/1980 | Burnett | ........................... | 5/450 |
| 4,371,997 A | 2/1983 | Mattson | .......................... | 5/450 |
| 4,624,877 A | 11/1986 | Lea et al. | ........................ | 428/71 |
| 4,890,885 A | 1/1990 | Grossmann | .................. | 297/284 |
| 4,960,304 A * | 10/1990 | Frantz | ...................... | 297/284.6 |
| 4,975,135 A | 12/1990 | Lowe | ........................... | 156/155 |
| 5,190,350 A * | 3/1993 | Hwang et al. | ................ | 297/380 |
| 5,457,833 A * | 10/1995 | Jay | ................................ | 5/654 |
| 5,660,438 A * | 8/1997 | Tedesco | .................... | 297/284.6 |
| 5,806,928 A * | 9/1998 | Gattuso et al. | ............ | 297/284.6 |
| 6,129,419 A | 10/2000 | Neale | ........................ | 297/284.4 |
| 6,306,112 B2 * | 10/2001 | Bird | ............................ | 602/27 |
| 6,651,277 B1 | 11/2003 | Marson | ......................... | 5/420 |
| 6,684,433 B2 * | 2/2004 | Giori et al. | ...................... | 5/709 |

* cited by examiner

*Primary Examiner*—Milton Nelson, Jr.

(57) ABSTRACT

The present invention provides a pneumatic foam cushion for use within a vehicle seat comprising a foam member with a contoured outer surface surrounded by an impermeable layer coextensive therewith. The impermeable layer, which may be a thermoplastic material, permits selective pressurization and depressurization of the foam member, and comprises a first impermeable member having a first contoured shape, and a second impermeable member having either the same shape as the first contoured shape, or a second contoured shape. The first and second impermeable members are matable around the foam member to form the impermeable layer. Preferably, the first and second impermeable members are heat sealed following placement around the foam member. A method of manufacturing a pneumatic foam cushion is also provided.

11 Claims, 2 Drawing Sheets

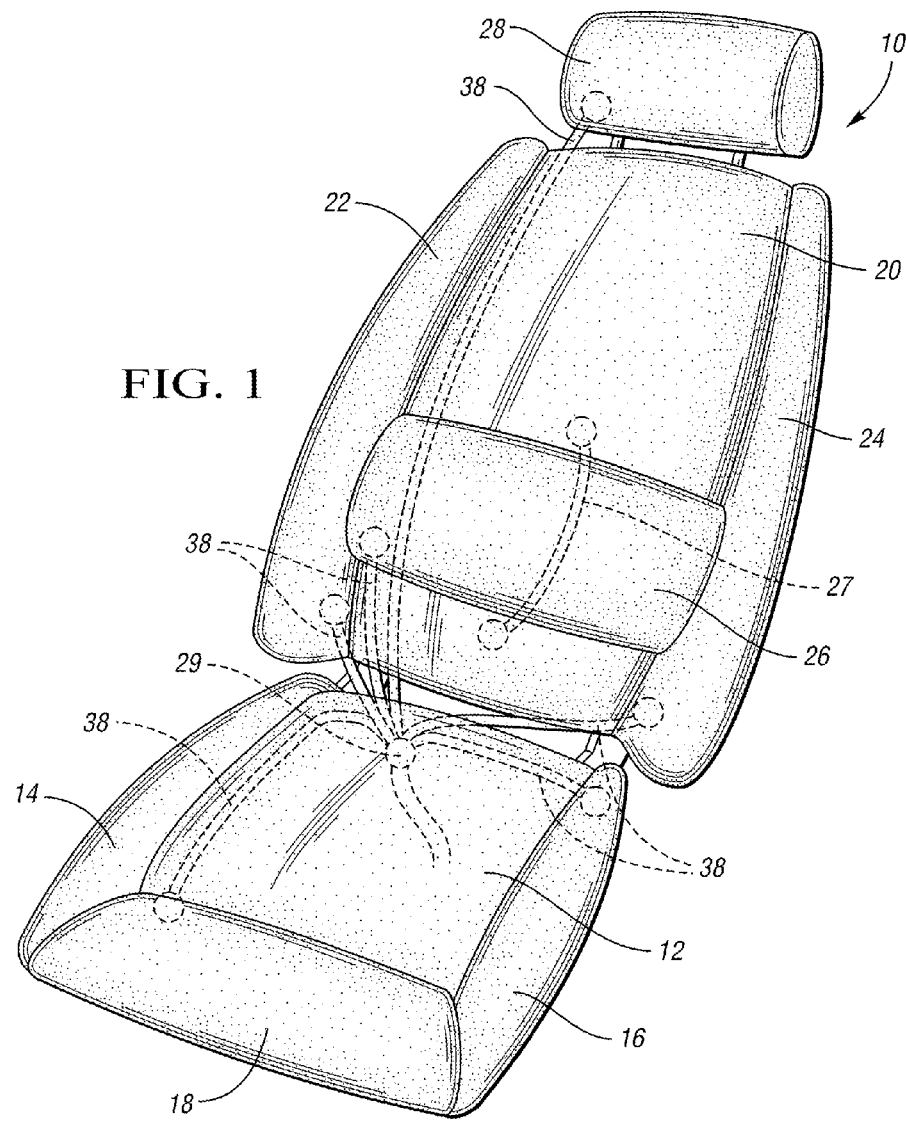
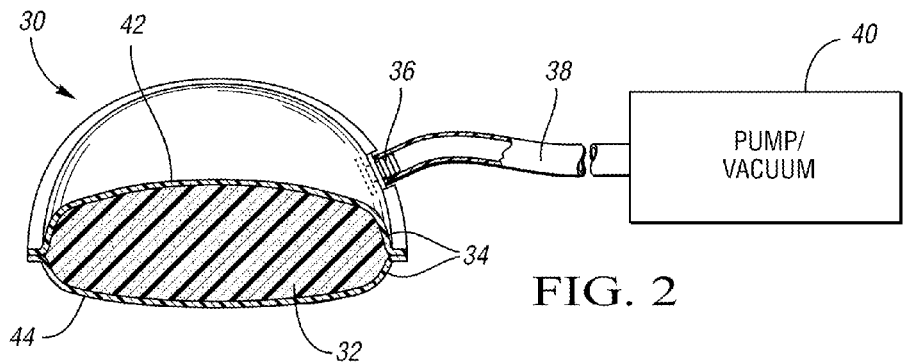

PNEUMATIC FOAM CUSHION

TECHNICAL FIELD

The present invention relates to vehicle seats, and, more particularly, to vehicle seats including foam which can be selectively pressurized and depressurized to maximize occupant comfort.

BACKGROUND OF THE INVENTION

A vehicle seat generally comprises a seating surface with a seat back attached thereto. The seating surface typically includes a seat cushion, side bolsters, and a front bolster. Similarly, the seat back usually includes a backrest cushion with a headrest extending therefrom, side supports, and a lumbar cushion. These various sections generally include an underlying foam substructure covered by a trim cover material, such as fabric, leather, etc.

SUMMARY OF THE INVENTION

The present invention provides a pneumatic foam cushion for use within a vehicle seat comprising a foam member with a contoured outer surface surrounded by an impermeable layer coextensive therewith. The impermeable layer, which may be a thermoplastic material, permits selective pressurization and depressurization of the foam member, and comprises a first impermeable member having a first contoured shape, and a second impermeable member having either the same shape as the first contoured shape, or a second contoured shape. The first and second impermeable members are matable around the foam member to form the impermeable layer. Preferably, the first and second impermeable members are heat sealed following placement around the foam member. The impermeable layer may also bond directly to the foam member.

In one aspect of the invention, a fluid conduit may extend through the impermeable layer to selectively permit fluid flow into and out of the foam member to thereby selectively pressurize and depressurize the foam member, respectively. The fluid conduit may attach to a pump to selectively force a fluid into the foam member to pressurize the foam member, and/or to a vacuum to selectively remove fluid from the foam member to depressurize the foam member. Alternatively, the fluid conduit may comprise a valve.

The present invention also provides an automotive vehicle seat comprising a foam member surrounded by an impermeable layer. The foam member may be cast. The impermeable layer may be a skin formed during casting of the foam member (i.e., the skin may be an integral portion of the foam member). Alternatively, the impermeable layer may be a separate material, formed as described above. A foam layer may at least partially cover the impermeable layer to provide thermal comfort for a seat occupant.

The present invention also provides a method of manufacturing a pneumatic foam cushion including the steps of forming the first impermeable member with the first contoured shape, and forming the second impermeable member with the second contoured shape, wherein the first and second contoured shapes are configured to be coextensive with a contoured outer surface of a cast foam member. The first and second impermeable members may be placed around the foam member and then heat sealed to form the impermeable layer. The fluid conduit may be inserted through the impermeable layer to selectively permit fluid flow into and out of the foam member to thereby selectively pressurize and depressurize the foam member. A portion of the cast foam member may be skived prior to enscapsulation between the first and second impermeable members to provide improved fluid flow.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic perspective view of a vehicle seat incorporating pneumatic foam cushions according to the present invention;

FIG. 2 is a schematic cross-sectional perspective view of a pneumatic foam cushion according to the present invention;

DESCRIPTION OF THE PREFERRED EMBODIMENTS

Figure 3:
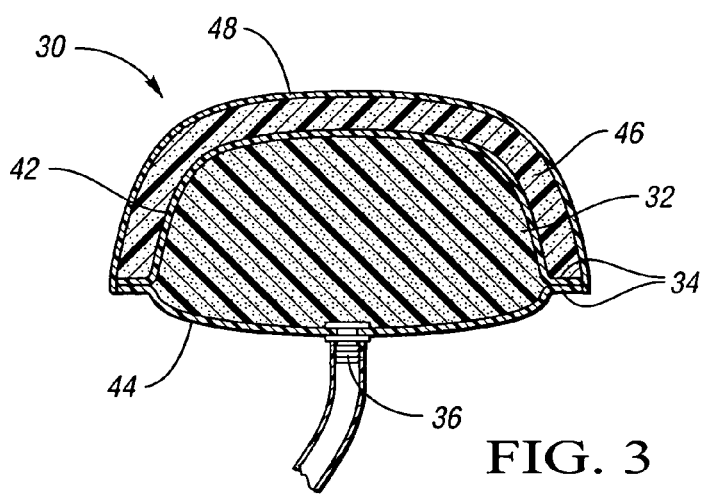
FIG. 3 is a schematic cross-sectional view of a pneumatic foam cushion according to the present invention, including an overlying foam layer and a trim fabric.

The invention provides a pneumatic foam cushion, as described below with respect to FIGS. 2-4, for use within a vehicle seat (shown at FIG. 1). The pneumatic foam cushion includes a foam member having a contoured outer surface, as described below with respect to FIG. 4. First and second impermeable members are shaped such that they are matable around the foam member and may form an impermeable layer coextensive with the outer surface of the foam member, as described below with respect to FIGS. 2-4. Once mated about the foam member, the impermeable layer allows the cushion to be selectively pressurized and depressurized by, for instance, a pump or vacuum, as described below with respect to FIGS. 2 and 3. Because the impermeable members are preshaped to match the contoured outer surface of the foam member, the resulting cushion provides superior aesthetic quality to the seat at all levels of pressurization. Additionally, because pressurization may be achieved via air, rather than added foam, the cushion may employ foam lower in both density and volume than foam typically used in a vehicle seat (i.e., non-pneumatic foam) to achieve desired occupant support thus reducing seat weight which potentially allows for the use of a more lightweight seat frame and also may increase fuel economy.

Referring to FIG. 1, a vehicle seat is generally shown at 10. The seat 10 has plurality of sections, including a seat cushion 12, first and second side bolsters 14, 16, a front bolster 18, a backrest cushion 20, first and second side wings 22, 24, a lumbar cushion 26, and a headrest 28. A plurality of hoses 38 interconnect each of the sections 12, 14, 16, 18, 20, 22, 24, 26, 28 to permit fluid delivery to pneumatic foam cushions housed in these sections, as described below. A single fluid entry point 29 may be provided, with the hoses 38 branching off therefrom. Alternatively, separate entry points may be provided for different sections. A shunted hose section 27 may provide a conduit for fluid transfer between sections at a location remote from the entry point 29.

FIG. 2 shows a schematic cross-sectional view of a pneumatic foam cushion 30 according to the present invention. Pneumatic foam cushions such as cushion 30 described herein can be used within any or all of the seat sections 12, 14, 16, 18, 20, 22, 24, 26, 28 to provide varying firmness as desired. The cushion 30 includes a foam member 32 encapsulated within an impermeable layer 34. In the preferred embodiment shown, the foam member 32 is heat bonded directly to the impermeable layer 34. The foam member 32 may be conventional seat foam as known in the art, preferably open cell polyurethane. The impermeable layer 34 may be made from any material capable of preventing escape of a working fluid into the surrounding environment. In the preferred embodiment, wherein air is used as the working fluid, the impermeable layer 34 comprises a thermoplastic fabric. Preferably, either a thermoplastic forming process or a pressure thermoplastic forming process is used to form each of the shaped impermeable members 42, 44. Those skilled in the art will readily understand these forming processes, as well as other forming processes that may be employed to form the impermeable members 42, 44. Since the foam member 32 is encapsulated within the impermeable layer 34, fluid introduced into the foam member 32 will remain within the foam member 32 until released.

A fluid conduit 36 extends through the impermeable layer 34 to regulate fluid transfer into and out of the foam member 32. In one embodiment, one of the hoses 38 of FIG. 1 attaches to the fluid conduit 36. Each of the hoses 38 are attached with respect to a delivery mechanism, shown schematically at 40 in FIG. 2. The delivery mechanism 40 includes a pump for pumping air into the hose 38, through the fluid conduit 36, and into the foam member 32, thereby pressurizing the foam member 32 to increase the firmness of the cushion 30. The delivery mechanism 40 may also act as a vacuum for providing suction to remove air from the foam member 32, thereby depressurizing the foam member 32 to decrease the firmness of the cushion 30. Alternatively, a valve (not shown) may extend through the impermeable layer 34 and function in lieu of the vacuum to depressurize the foam member 32. Selective opening of the valve allows fluid to escape from the foam member 32 into the surrounding environment to depressurize the foam member 32. The vacuum function of delivery mechanism 40 may also be employed to substantially evacuate air from the foam member 32 in order to collapse the cushion 30. This enables compact storage, which may be especially useful if the cushion is employed in a folding or removable seat.

Alternatively, the present invention may be practiced without the use of a hose 38 or a delivery mechanism 40. For example, the fluid conduit 36 could comprise an input valve designed to allow air from the surrounding environment to enter into the foam member 32 to allow pressurization of the foam member 32 up to atmospheric pressure. An output valve would also be provided to selectively allow air to exit the foam member 32 into the surrounding environment until a desired level of firmness is achieved when, for instance, an occupant sits on the cushion 30. Because the input valve cannot allow air into the cushion 30 when the cushion 30 is pressurized above atmospheric pressure, an occupant seated within the seat 10 desiring increased firmness would exit the seat 10 to allow re-pressurization via the input valve.

The impermeable layer 34 comprises first and second impermeable members 42, 44 matable around the foam member 32. Specifically, the first and second impermeable members 42, 44 fit around the foam member 32, and are then sealed to one another to form the impermeable layer 34. While heat sealing is the preferred method of sealing the first and second impermeable members 42, 44, any method of sealing may be used, provided the resulting impermeable layer 34 is leak proof.

The first and second impermeable members 42, 44 are pre-formed in approximately the same shape as the foam member 32 as described below. Using pre-shaped first and second impermeable members 42, 44 that follow the often complex contoured outer surface 50 (see FIG. 4) of the specific foam member 32 utilized for each seat section 12, 14, 16, 18, 20, 22, 24, 26, 28 ensures that the desired form of the underlying foam member 32 is preserved. That is, if a flat sheet were employed for the impermeable layer, the underlying foam member would be unduly restricted, especially at edges and corners; only a flat, pancake-like shape would be achieved when the foam is depressurized. This may not meet aesthetic and design goals.

Additionally, using pre-shaped first and second impermeable members 42, 44 complements the use of a pre-cast foam member 32. If a foam member were injection molded into a pre-formed impermeable layer, it would be difficult to ensure that the injected foam did not interfere with the area intended for a fluid conduit. Since the present invention employs first and second impermeable members 42, 44 specifically sized to surround the pre-cast foam member 32, and because the pre-cast foam member 32 is formed prior to placing the impermeable members 42, 44 therearound, fluid conduit 36 connectivity is not compromised.

Furthermore, cast foam produced for vehicle seating applications typically includes an outer skin after completion of the casting process. The outer skin can restrict fluid flow into and out of the foam. Use of a pre-cast foam member 32 allows a manufacturer to skive a portion of the outer skin (at the area where the fluid conduit 36 will interface with the foam member 32) prior to encapsulation between the first and second impermeable members 42, 44, thereby allowing for superior fluid flow through the skived portion. The outer skin of the precast foam functions as a substantially impermeable layer, although it is more porous (i.e., includes a substantial number of pin hole-sized leak points) than the impermeable layer 44 described herein. However, one embodiment of a pneumatic foam cushion may utilize the cast skin to define the outer contoured surface of the foam member in lieu of a separate imperious layer.

Figure 4:
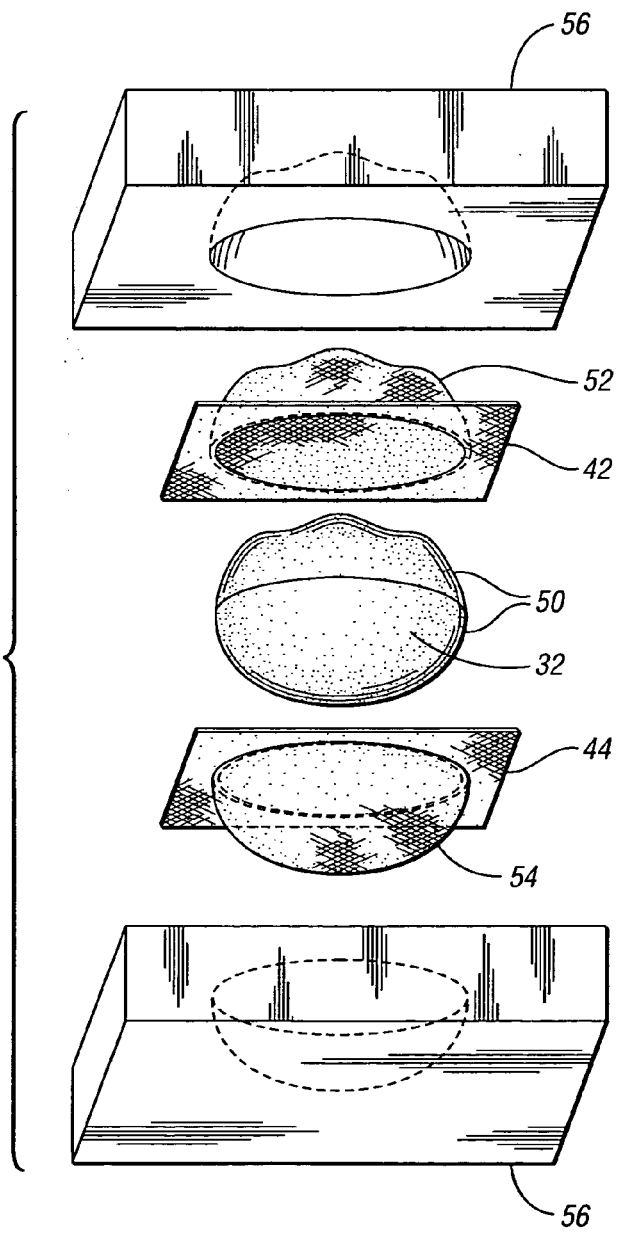
FIG. 4 shows a schematic exploded view of component parts of a pneumatic foam cushion such as in FIGS. 1-3, and a tool used during manufacture thereof.

FIG. 3 presents a cross-sectional perspective view of a pneumatic foam cushion 30 using a foam member 32 having a different shape than that shown in FIG. 2. A foam layer 46 covers at least a portion of the impermeable layer 34. The foam layer 46 has great air flow capability than the impermeable layer 34, and therefore prevents thermal discomfort of a seat occupant caused by lack of air flow between the occupant and the impermeable layer 34. A trim fabric 48 covers the foam layer 46. The trim fabric 48 may be chosen according to customer preference.

The present invention also provides a method for manufacturing the seat cushion 30 described herein. Referring to FIG. 4, the pre-cast foam member 32 includes a contoured outer surface 50. The first and second impermeable members 42, 44 are pre-formed to be coextensive with the contoured outer surface 50, extending around the entire periphery of the foam member 32, such that the first impermeable member 42 has a first contoured shape 52, while the second impermeable member 44 has a second contoured shape 54. It should be noted that first and second impermeable members 42, 44 could have substantially identical contoured shapes, as in the case where the contoured outer surface 50 is substantially symmetrical. Preferably, the first and second impermeable members 42, 44 are vacuum formed or suction blow molded using appropriate tools as is known in the art. However, the first and second impermeable members 42, 44 may be manufactured in any manner that will provide the first and second contoured shapes 52, 54.

The foam member 32 is pre-cast in a casting tool as known in the art. The skin formed during the casting process is preferably skived to reveal a superior air flow surface. The fluid conduit 36 is preferably positioned between the first and second impermeable members 42, 44, and the first and second impermeable members 42, 44 are then sealed around the foam member 32 to create the impermeable layer 34, with the fluid conduit 36 extending therethrough. Preferably, the first and second impermeable members 42, 44 are heat sealed using a sealing tool 56. The first and second impermeable members 42, 44 are placed around the foam member 32 within the tool, and then the entire assembly is heated. Heating binds the first and second impermeable members 42, 44 to one another to create the impermeable layer 34, while also bonding the foam member 32 to the first and second impermeable members 42, 44.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. A pneumatic foam cushion for use within a vehicle seat comprising:
   a foam member having a contoured, at least partially curved, outer surface;
   a first impermeable member characterized by a first contoured, at least partially curved, shape substantially the same as a portion of said contoured, at least partially curved, outer surface of the foam member when not in contact with said foam member; and
   a second impermeable member characterized by one of said first contoured, at least partially curved, shape and a second contoured, at least partially curved, shape substantially the same as another portion of said contoured, at least partially curved, outer surface of said foam member when not in contact with said foam member; and
   wherein said first and second impermeable members are positionable in contact with said respective portions of said contoured, at least partially curved, outer surface of said foam member to form an impermeable layer substantially coextensive with said contoured, at least partially curved, outer surface such that said foam member retains said contoured, at least partially curved, outer surface and said first and second impermeable members retain said respective contoured, at least partially curved, shapes when positioned in contact with said outer surface of said foam member to form said impermeable layer, said impermeable layer permitting selective pressurization and depressurization of said foam member within said vehicle seat.

2. The pneumatic foam cushion of claim 1, further comprising:
   a fluid conduit extending through said impermeable layer, said fluid conduit selectively permitting fluid flow in and out of said foam member to thereby selectively pressurize and depressurize said foam member, respectively.

3. The pneumatic foam cushion of claim 2, wherein said fluid conduit attaches to a pump, said pump selectively forcing fluid into said foam member to pressurize said foam member.

4. The pneumatic foam cushion of claim 2, wherein said fluid conduit attaches to a vacuum, said vacuum selectively removing fluid from said foam member to depressurize said foam member.

5. The pneumatic foam cushion of claim 2, wherein said fluid conduit comprises a valve.

6. The pneumatic foam cushion of claim 1, wherein said impermeable layer comprises a thermoplastic material.

7. The pneumatic foam cushion of claim 1, wherein said impermeable layer is bonded to said foam member.

8. The pneumatic foam cushion of claim 1, wherein said first and second impermeable members are formed by one of vacuum forming and suction blow molding.

9. The pneumatic foam cushion of claim 1, wherein said first and second impermeable members are heat sealed to one another around said foam member.

10. The pneumatic foam cushion of claim 9, wherein said foam member is skived prior to heat sealing said first and second impermeable members therearound to provide improved fluid flow in and out of said foam member.

11. An automotive vehicle seat comprising:
    a foam member having a contoured, at least partially curved, outer surface;
    an impermeable layer substantially coextensive with said contoured outer surface and encapsulating said foam member, said foam member being selectively pressurizable to maximize occupant comfort;
    a foam layer at least partially covering said impermeable layer; and wherein said impermeable layer comprises a first impermeable member having a first contoured, at least partially curved, shape substantially the same as a portion of said contoured, at least partially curved, outer surface of said foam member when not in contact with said foam member, and a second impermeable member having one of said first contoured, at least partially curved, shape and a second contoured, at least partially curved, shape substantially the same as another portion of said contoured, at least partially curved, outer surface of said foam member when not in contact with said foam member, said first and second impermeable members being positionable in contact with said respective portions of said contoured, at least partially curved, outer surface of said foam member to form said impermeable layer such that said foam member retains said contoured, at least partially curved, outer surface and said first and second impermeable members retain said respective contoured, at least partially curved, shapes when positioned in contact with said outer surface of said foam member.

* * * * *